United States Patent
Nakagawa

(10) Patent No.: US 7,455,053 B2
(45) Date of Patent: Nov. 25, 2008

(54) FUEL SUPPLY APPARATUS FOR MOTOR CYCLE

(75) Inventor: Mitsuyuki Nakagawa, Kawasaki (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/657,617

(22) Filed: Jan. 25, 2007

(65) Prior Publication Data

US 2007/0199884 A1 Aug. 30, 2007

(30) Foreign Application Priority Data

Feb. 27, 2006 (JP) .............................. 2006-050243

(51) Int. Cl.
  *F02M 37/04* (2006.01)
(52) U.S. Cl. ..................................... 123/509
(58) Field of Classification Search ................... 123/509
See application file for complete search history.

(56) References Cited

U.S. PATENT DOCUMENTS

| | | | | |
|---|---|---|---|---|
| 4,871,041 A * | 10/1989 | Saito et al. | .................. | 180/219 |
| 5,127,560 A * | 7/1992 | Miyamoto et al. | .......... | 224/413 |
| 5,272,918 A * | 12/1993 | Gaston et al. | ............. | 73/290 R |
| 6,182,640 B1 * | 2/2001 | Nakashima et al. | ......... | 123/516 |
| 6,253,790 B1 * | 7/2001 | Hara | ..................... | 137/565.17 |
| 6,357,424 B1 * | 3/2002 | Sonoda et al. | .............. | 123/509 |
| 6,401,750 B2 * | 6/2002 | Tokunaga | .............. | 137/565.34 |
| 6,609,503 B1 * | 8/2003 | Nakagawa et al. | .......... | 123/509 |
| 6,655,363 B2 * | 12/2003 | Kobayashi et al. | .......... | 123/509 |
| 6,761,193 B1 * | 7/2004 | Cotton et al. | .................. | 141/98 |
| 6,907,865 B1 * | 6/2005 | Hanby | ......................... | 123/509 |
| 7,228,848 B1 * | 6/2007 | Rangel et al. | ................ | 123/509 |
| 7,275,523 B2 * | 10/2007 | Kimura et al. | ............... | 123/509 |
| 2003/0102035 A1 * | 6/2003 | Dasilva et al. | ......... | 137/565.34 |
| 2005/0126546 A1 * | 6/2005 | Yagisawa | ..................... | 123/509 |
| 2007/0098573 A1 * | 5/2007 | Ueno et al. | .................. | 417/360 |
| 2007/0102216 A1 * | 5/2007 | Satake et al. | ................. | 180/219 |
| 2007/0216151 A1 * | 9/2007 | Asamura et al. | ............ | 280/833 |
| 2007/0235089 A1 * | 10/2007 | Koike | ..................... | 137/565.17 |
| 2008/0011534 A1 * | 1/2008 | Miyashiro | .................... | 180/219 |

FOREIGN PATENT DOCUMENTS

JP 11-093794 6/1999

* cited by examiner

*Primary Examiner*—Thomas N Moulis
(74) *Attorney, Agent, or Firm*—Bacon & Thomas, PLLC

(57) ABSTRACT

To provide a fuel supply apparatus which is preferably applied to a motorcycle having a flat-shaped fuel tank with a shallow fuel tank, a lower opening portion (Tb) open at a bottom portion (Ta) of a fuel tank (T) is closed by a lid member (1), a fuel pump (P) is attached to a stay (2) provided in a rising manner on the lid member (1), a longitudinal axis (X-X) of the fuel pump (P) is arranged approximately in parallel to the lid member (1), a pump discharge path (Pb) of the fuel pump (P) is arranged close to a discharge pipe (3) provided in a rising manner on the lid member (1) and is connected by a fuel discharge piping (5), and a filter (4) connected to a pump intake path (Pa) is arranged between the fuel pump (P) and the lid member (1).

2 Claims, 4 Drawing Sheets

FUEL SUPPLY APPARATUS FOR MOTOR CYCLE

BACKGROUND OF THE INVENTION

1. Field of the Invention

The present invention relates to a fuel supply apparatus used in a fuel injection apparatus structured such that a fuel pump is arranged so as to be inserted to a fuel tank via an opening portion provided at a fuel tank, the opening portion is closed by a lid member, a fuel within the fuel tank is boosted by the fuel pump, and the boosted fuel is supplied to a fuel injection valve by a fuel piping so as to be injected and supplied to an engine, and more particularly to a fuel supply apparatus for a motor cycle in which the opening portion of the fuel tank is provided at a bottom portion of the fuel tank, and the fuel pump is arranged so as to be inserted into the fuel tank from a lower opening portion.

2. Description of the Conventional Art

One example of the fuel supply apparatus for the motor cycle is shown in Japanese Unexamined Patent Publication No. 11-93794.

In accordance with this structure, the lower opening portion is provided at the bottom portion at the lower side of the fuel tank, and the lower opening portion is closed by a flat plate shaped lid member. A stay is provided in a rising manner on the lid member so as to be directed to an inner side of the fuel tank, and a fuel pump is attached to the stay so as to be directed to a diagonally upper side with respect to the lid member.

Further, a pump discharge path is arranged in a protruding manner so as to be directed further to an upper side from an upper end of the fuel pump, and the pump discharge path is provided in a rising manner on the lid member and is connected to a discharge pipe open toward an outer side by a fuel discharge pipe.

In accordance with structure mentioned above, the fuel supply apparatus is formed by the stay, the fuel pump, a filter, the fuel piping, the lid member and the like, the structures such as the fuel pump, the filter and the like attached to the stay are arranged so as to be inserted into the fuel tank via the lower opening portion of the fuel tank, and the lower opening portion of the fuel tank is held so as to be closed by the lid member.

Accordingly, the fuel reserved within the fuel tank is boosted by the fuel pump arranged within the fuel tank, and the boosted fuel is supplied toward an external portion via a pump discharge path, a fuel discharge piping, and a discharge pipe provided in a rising manner on the lid member.

In this case, a pressure regulator regulating a pressure of the fuel boosted by the fuel pump to a predetermined pressure is attached to a throttle body at an outer side of the fuel tank, and surplus fuel of the pressure regulator is returned into the fuel tank via a return fuel piping.

SUMMARY OF THE INVENTION

Problem to be Solved by the Invention

In accordance with the fuel supply apparatus mentioned above, the fuel pump attached to the stay is arranged so as to largely protrude toward a diagonally upper side within the fuel tank.

In accordance with this structure, a freedom of arranging the fuel pump within the fuel tank of the motor cycle which employs a flat fuel tank having a shallow tank depth in view of appearance design, is greatly obstructed, for the reason of being mounted to a frame of the motor cycle. In other words, a shape of the fuel tank is limited in such a manner as to prevent an upper portion of the fuel pump from being interfered.

In recent years, there has been developed a conversion of a fuel supply system from a conventional carburetor fuel supply system to a fuel injection apparatus using a fuel injection valve, in the motor cycle. However, there is generated a problem that the conventional fuel tank can not be diverted as it is in the case of this conversion.

On the other hand, it can be considered that the shape of the fuel tank is changed due to the above reason. However, in this case, a metal mold cost of the tank is largely increased, and an appearance shape of the motor cycle is largely changed, so that such is not preferable.

Further, in the case that the pump discharge path of the fuel pump largely protrudes to the upper side, a pipe length of the fuel discharge piping, which is provided in a rising manner on the lid member and connects the discharge pipe and the pump discharge path, is elongated. Accordingly, good discharging characteristic of vapor generated within the fuel pump is obstructed.

A fuel supply apparatus for a motor cycle in accordance with the present invention is made by taking the problem mentioned above into consideration, and a main object of the present invention is to provide a fuel supply apparatus having an excellent mounting property to a fuel tank formed in a flat shape such as that of a motor cycle and to provide a fuel supply apparatus, in which a passage length of a fuel discharge piping connecting a pump discharge path of a fuel pump and a discharge pipe provided in a rising manner on a lid member can be shortened, and discharging characteristic of vapor generated in the fuel pump can be enhanced.

Means for Solving the Problem

In order to achieve the object mentioned above, in accordance with a first aspect of the present invention, there is provided a fuel supply apparatus for a motor cycle in which a fuel pump is attached to a stay provided in a rising manner on a lid member closing a lower opening portion provided at a bottom portion of a fuel tank, a pump discharge path of the fuel pump is connected to a discharge pipe provided in a rising manner on the lid member, a pump intake path is connected to a filter, and a fuel pump including the filter is arranged so as to be inserted into the fuel tank via the lower opening portion, wherein a longitudinal axis of the fuel pump is arranged approximately in parallel to the lid member, the pump discharge path is arranged near the discharge pipe, and the filter connected to the pump intake path is arranged between the fuel pump and the lid member horizontally in parallel with a bottom portion of the fuel tank.

Further, in accordance with a second aspect of the present invention, in addition to the first aspect mentioned above, a filter cover is arranged in a surrounding manner around the filter, the filter cover being formed by a rubber material, having a base portion attached to an outer periphery of the fuel pump and being formed in a box shape, and an opening portion open toward an upper side is provided at an upper side surface of the filter cover.

Further, in accordance with a third aspect of the present invention, in addition to the second aspect mentioned above, the filter cover surrounding an outer periphery of the filter is formed by an opening chamber open toward an upper side along an outer periphery of the fuel pump and a closing chamber connected to the opening chamber, an opening portion facing to an inner side of the closing chamber is open at the opening chamber, a return fuel passage of a pressure regulator is connected to the opening portion, and return fuel of the pressure regulator is discharged toward the closing chamber from the opening portion.

Effect of the Invention

In accordance with the first aspect of the present invention, the fuel pump including the filter is arranged so as to be inserted into the fuel tank from the lower opening portion open at the bottom portion of the fuel tank, and the lower opening portion is closed by the lid member.

When the fuel pump is activated, the fuel within the fuel tank is sucked into the fuel pump via the filter, and the fuel boosted by the fuel pump is supplied to an external portion via the pump discharge path, the fuel discharge piping and the discharge pipe.

Since the longitudinal axis of the fuel pump is arranged approximately in parallel to the lid member, it is possible to arrange the fuel pump near the bottom portion of the fuel tank and it is possible to prevent the fuel pump from largely protruding, at a time when the lid member closes the lower opening portion of the fuel tank, whereby it is possible to extremely easily arrange it within the fuel tank formed in the flat shape of the motor cycle.

Accordingly, it is possible to largely improve a freedom of a mounting property of the fuel pump into the fuel tank and it is not necessary to change the shape of the conventionally used flat-shaped fuel tank.

Further, since the filter is arranged between the fuel pump and the lid member, it is possible to arrange the filter near the bottom portion of the fuel tank, and it is possible to effectively suck the fuel within the fuel tank.

In other words, it is possible to reduce a fuel amount (a dead remaining amount) within the fuel tank which can not be sucked by the fuel pump.

Further, since the pump discharge path of the fuel pump is arranged near the discharge pipe provided in a rising manner on the lid member, it is possible to shorten the pipe length of the fuel discharge piping connecting the pump discharge path and the discharge pipe, whereby it is possible to improve a discharging property of the vapor generated within the fuel pump.

Further, in accordance with the second aspect of the present invention, the box-shaped filter cover formed by the rubber material is arranged in the surrounding manner around the outer periphery of the filter.

In accordance with the structure mentioned above, since the filter is not directly brought into contact with the bottom portion of the fuel tank at a time when the filter is arranged close to the bottom portion of the fuel tank, abrasion or deformation of the filter due to collision is not generated, and it is possible to maintain a stable filtering performance of the filter for a long time.

Further, the opening portion open toward the upper side is provided at the upper side surface of the filter cover, and the fuel within the fuel tank is supplied to the filter via the opening portion.

In accordance with the structure mentioned above, a foreign material floating in the fuel within the fuel tank settles down on the upper side surface of the filter facing to the opening portion so as to be attached, just after the engine stops, and is not attached to the entire of the upper side surface of the filter, and it is possible to maintain a good filtering performance of the filter.

Further, in accordance with the third aspect of the present invention, the filter is arranged so as to be accommodated within the opening chamber open toward the upper side and the closing chamber and surplus fuel of the pressure regulator is discharged into the opening chamber from the opening portion via the return fuel passage.

Further, since the opening portion is open in the opening chamber, and is open so as to face to the closing chamber, the surplus fuel discharged from the opening portion temporarily flows into the closing chamber from the opening chamber, is inverted in its flow within the closing chamber, and is returned into the fuel tank from the opening portion of the opening chamber.

In accordance with the structure mentioned above, the surplus fuel is discharged into the fuel tank from the opening portion of the opening chamber while generating an eddy current within the closing chamber, can securely peel away the foreign material attached to the filter from the filter, and can securely discharge the foreign material out of the filter cover.

Further, since the surplus fuel flowing through the return fuel passage particularly forms a large flow rate at a time of a low speed operation of the engine, it is possible to well discharge the foreign material at a time of the low speed operation of the engine.

DETAILED DESCRIPTION OF PREFERRED EMBODIMENT

Figure 1:
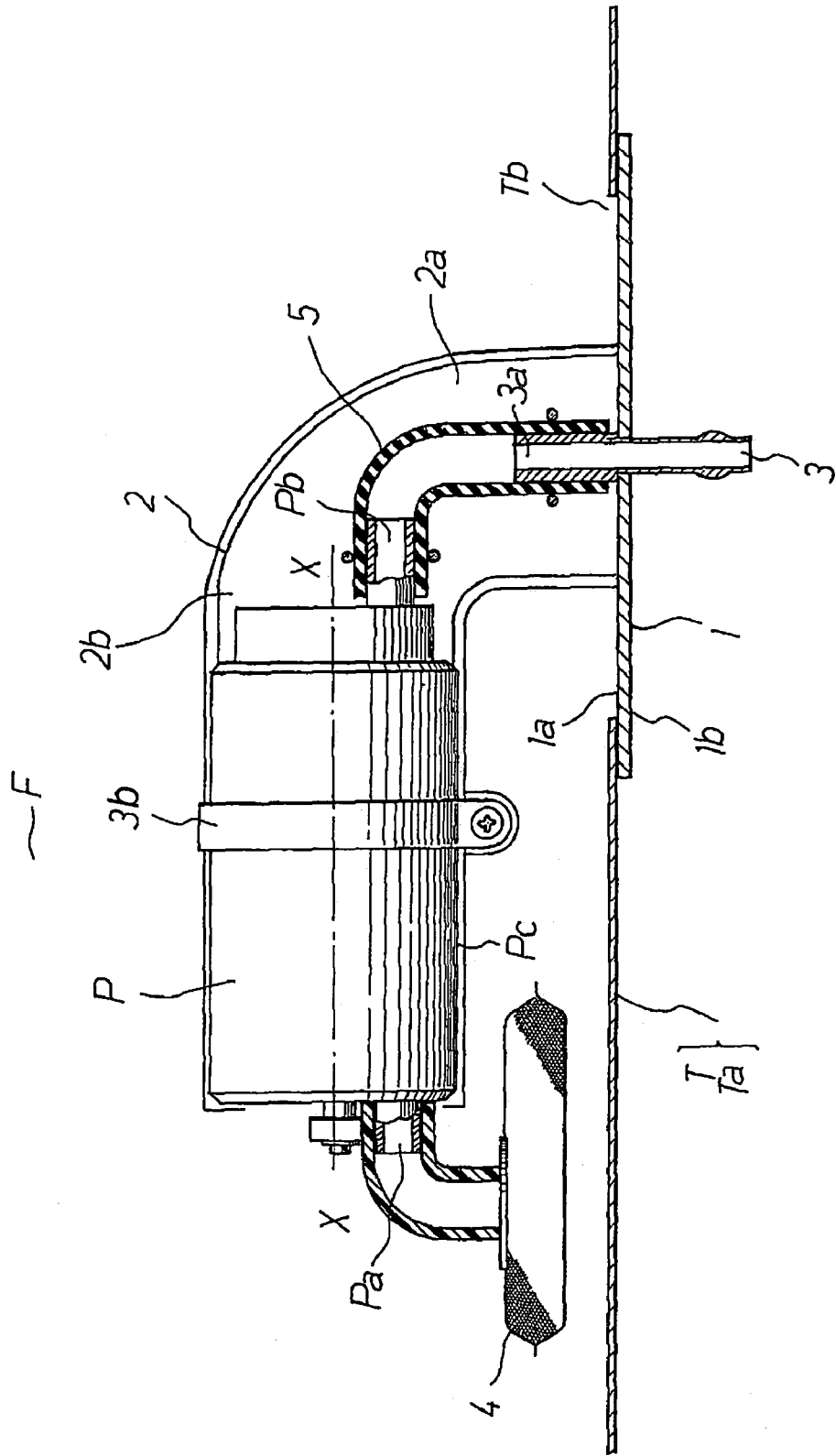
FIG. 1 is a vertical cross sectional view of a main portion showing an embodiment of a fuel supply apparatus for a motor cycle in accordance with the present invention.

A description will be given below of an embodiment of a fuel supply apparatus for a motor cycle in accordance with the present invention with reference to FIG. 1.

Reference symbol T denotes a fuel tank in which fuel is reserved. In the fuel tank T, an oil supply hole (not shown) is open to an upper portion in a gravitational direction, and a lower opening portion Tb is provided so as to be open at a lower side bottom portion Ta.

Reference numeral 1 denotes a flat shaped lid member which is fixed by screw to the bottom portion Ta of the fuel tank T, and holds the lower opening portion Tb so as to close in an airtight manner. A stay 2 formed by a plate member is arranged so as to be fixed onto an upper surface 1a of the lid member 1 in accordance with a welding or the like.

The stay 2 is formed by an upper wall portion 2a directed to an upper side from the upper surface 1a of the lid member 1, and a side wall portion 2b directed to a left side in the drawing from the upper wall portion 2a.

Further, a discharge pipe 3 is arranged so as to be fixed to the lid member 1, and the discharge pipe 3 protrudes toward an upper side from the upper surface 1a and protrudes toward a lower side from the lower surface 1b.

Reference symbol P denotes a motor-driven type fuel pump in which a pump portion and a motor portion are accommodated within a tubular housing. A pump intake path Pa is open at a left end thereof in a protruding manner, and a pump discharge path Pb is open at a right end thereof in a protruding manner. The fuel pump P mentioned above sucks the fuel to the pump portion from the pump intake path Pa, and the fuel boosted by the pump portion is discharged from the pump discharge path Pb.

Further, the fuel pump P is attached to the side wall portion 2b of the stay 2 via a band 3b, and a longitudinal axis X-X of the fuel pump P is arranged approximately in parallel along the lid member 1 at this time. Further, in the layout mentioned above, the pump discharge path Pb is arranged near an upper discharge pipe 3a. Further, a filter 4 formed in a mesh shape, a sponge shape or the like and having a filtering function is arranged so as to be installed to the pump intake path Pa. The filter 4 is arranged between the fuel pump P and the lid member 1.

More specifically, it is arranged between a lower outer surface Pc of the fuel pump P and the upper surface 1a of the lid member 1.

Further, the pump discharge path Pb and the upper discharge pipe 3a are connected by a fuel discharge piping 5, for example, formed by a rubber material.

In accordance with the structure mentioned above, a fuel supply apparatus F is formed as follows.

The fuel pump P is attached to the stay 2 provided in a rising manner on the lid member 1 via the band 3b, and the longitudinal axis X-X of the fuel pump P is arranged approximately in parallel to the lid member 1.

The filter 4 is installed to the pump discharge path Pa of the fuel pump P, the filter 4 is arranged between the lower outer surface Pc of the fuel pump P and the upper surface 1a of the lid member 1, the pump discharge path Pb of the fuel pump P is arranged near the upper discharge pipe 3a protruding to the upper side from the upper surface 1a of the lid member 1, and the upper discharge pipe 3a and the pump discharge path Pb are connected by the fuel discharge piping 5.

Further, the filter 4 of the fuel supply apparatus F, the stay 2 including the fuel pump P, the upper discharge pipe 3a, and the fuel discharge piping 5 including the pump discharge path Pb are arranged so as to be inserted into the fuel tank T via the lower opening portion Tb of the fuel tank T, and the lid member 1 is fixed by screw to the fuel tank T in this state, whereby the lower opening portion Tb of the fuel tank T is held in a closed manner by the lid member 1.

When the fuel pump P is driven in the fuel supply apparatus mentioned above, a foreign material of the fuel within the fuel tank T is removed by the filter 4, the fuel within the fuel tank T is sucked to the pump portion (not shown) within the fuel pump P from the pump intake path Pa so as to be boosted, the boosted fuel is supplied to the pump discharge path Pb, and the fuel in the pump discharge path Pb is supplied to the fuel injection valve (not shown) at an outer side of the fuel tank T via the fuel discharge piping 5 and the discharge pipe 3.

In accordance with the fuel supply apparatus on the basis of the present invention, since the longitudinal axis X-X of the fuel pump P attached to the stay 2 is arranged approximately in parallel to the lid member 1, it is possible to arrange the fuel pump P near the bottom portion Ta of the fuel tank T at a time when the fuel pump P is arranged within the fuel tank T from the lower opening portion Tb of the fuel tank T, and the fuel pump P is not arranged so as to protrude largely to the upper side within the fuel tank T.

In accordance with the structure mentioned above, it is possible to largely improve a freedom of installing to a fuel tank having a flat shape in which a depth of the fuel tank is shallow, and the structure is preferable as a fuel supply apparatus for a motor cycle employing the flat type fuel tank.

Further, in accordance with the structure mentioned above, since it is sufficient that the lower opening portion Tb is provided simply at the bottom portion Ta in the conventional flat type fuel tank, it is possible to divert the fuel tank as it is even at a time of changing the fuel supply method from the conventional carburetor type to the fuel injection apparatus, it is possible to suppress an increase of a metal mold cost caused by modification of the fuel tank, and it is not necessary to review an appearance of the motor cycle because of a shape change of the fuel tank.

Further, since the filter 4 is arranged between the lower outer surface Pc of the fuel pump P and the upper surface 1a of the lid member 1, it is possible to arrange the filter 4 near the bottom portion Ta of the fuel tank T, whereby it is possible to sufficiently suck the fuel within the fuel tank, and it is possible to reduce a dead remaining amount of the fuel within the fuel tank T which can not be sucked by the fuel pump P.

Further, since the pump discharge pipe Pb of the fuel pump P is arranged near the discharge pipe 3 (the upper discharge pipe 3a) provided in a rising manner on the lid member 1, it is possible to shorten the pipe length of the fuel discharge piping 5 connecting the pump discharge path Pb and the discharge pipe 3, and it is possible to immediately discharge vapor generated within the fuel pump P toward an external portion.

Next, a description will be given of another embodiment of the fuel supply apparatus for the motor cycle in accordance with the present invention with reference to the accompanying drawings.

Figure 2:
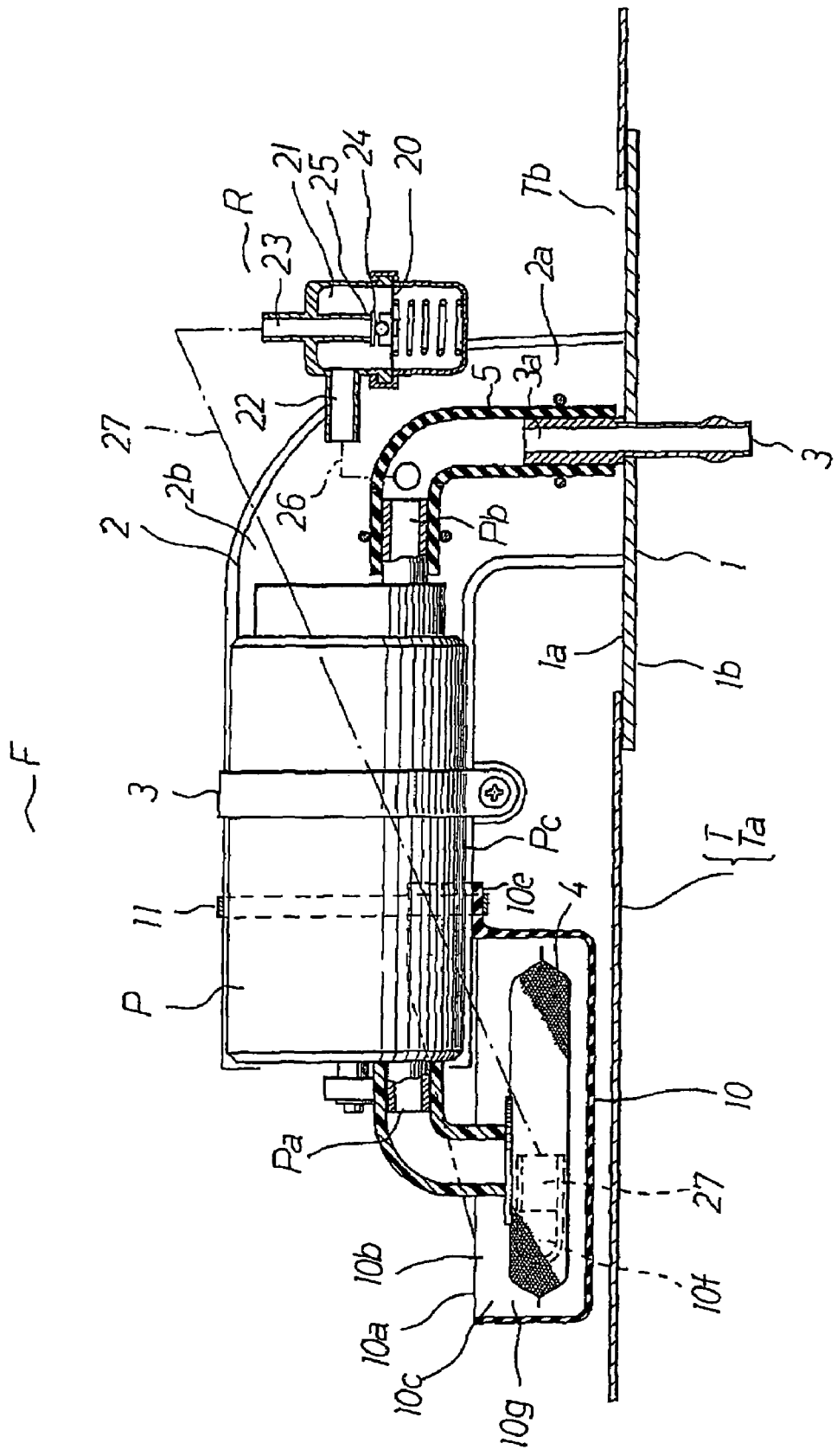
FIG. 2 is a vertical cross sectional view of a main portion showing another embodiment of the fuel supply apparatus for the motor cycle in accordance with the present invention.
Figure 3:
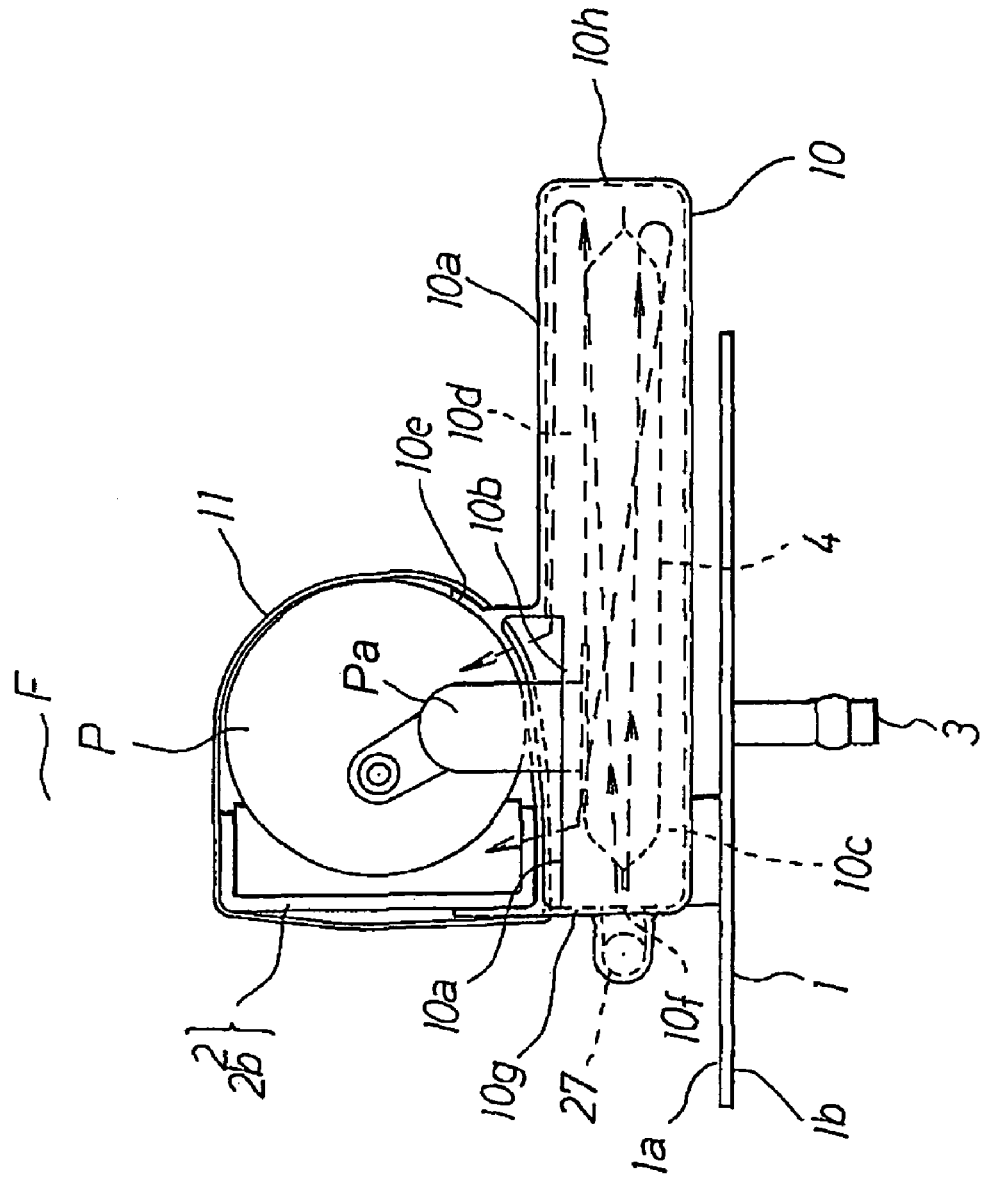
FIG. 3 is a left side view of FIG. 2.
Figure 4:
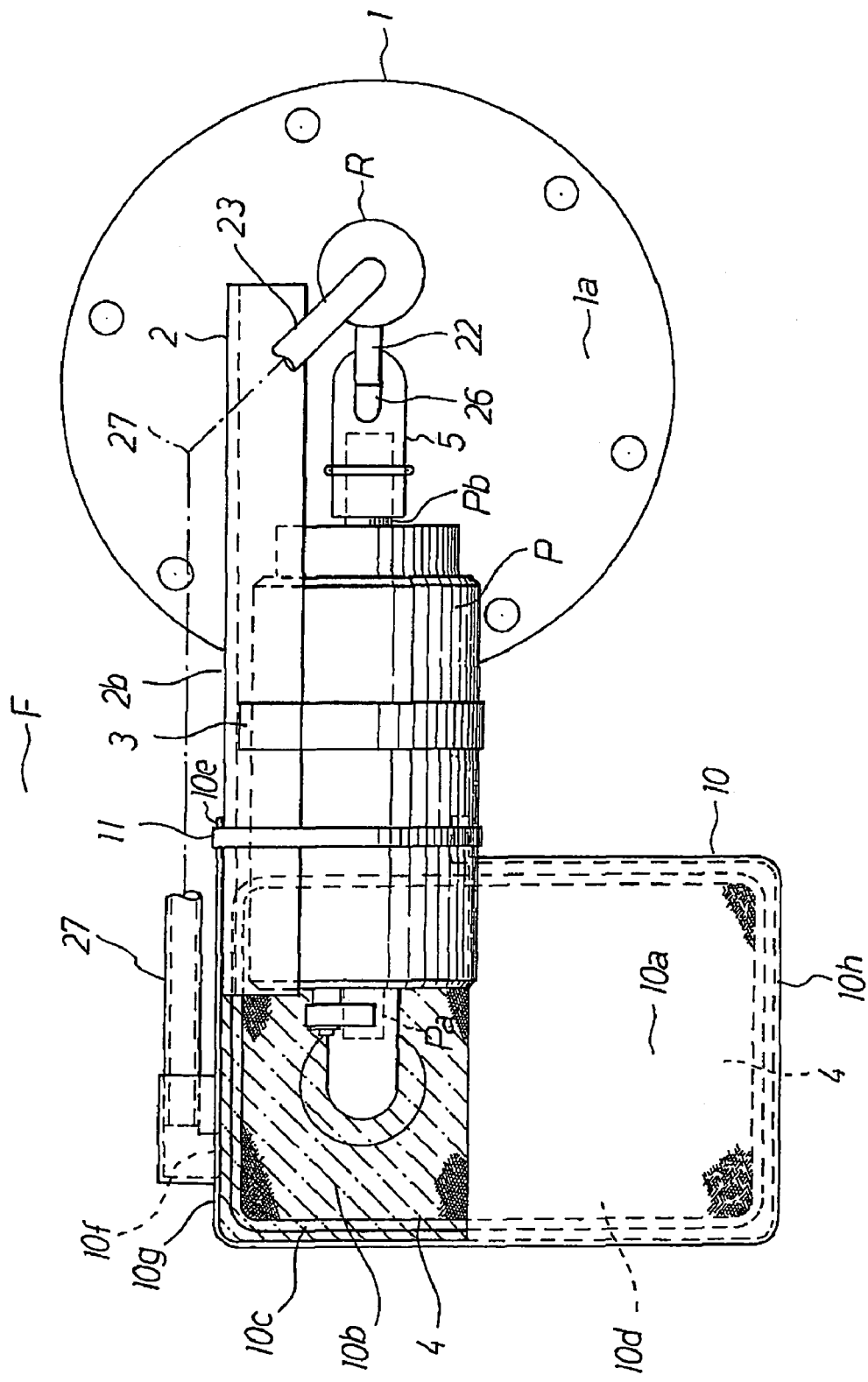
FIG. 4 is a plan view of an upper portion of FIG. 2.

FIG. 2 is a front view including a partial vertical cross section of the fuel supply apparatus. FIG. 3 is a left side view of FIG. 2. FIG. 4 is a plan view of an upper portion of FIG. 2.

In this case, the same reference numerals are attached to the same structure portions as those in FIG. 1, and description thereof will be omitted.

Reference numeral 10 denotes a filter cover arranged so as to surround an outer periphery of the filter 4. The filter cover 10 is formed in a box shape and is formed by a rubber material having an elasticity.

In more details, the filter cover 10 formed in the box shape is structured such that an opening portion 10b is provided at an upper surface 10a along an outer periphery in a longitudinal direction of the fuel pump P, whereby the filter cover 10 is formed by an opening chamber 10c open to an upper side by the opening portion 10b, and a box-shaped closing chamber 10d connected to the opening chamber 10c. The opening portion is shown by a single-dot chain line in FIG. 4.

In FIG. 3, the opening chamber 10c is formed in a left side of the filter cover 10, and the closing chamber 10d is continuously provided at a right side from the opening chamber 10c.

In accordance with the structure mentioned above, a part close to the pump intake path Pa of the filter 4 (a left side of the filter 4 in FIG. 3) is arranged so as to be accommodated within the opening chamber 10c of the filter cover 10, and the remaining part of the filter 4 is arranged so as to be accommodated within the closing chamber 10d connected to the opening chamber 10c.

In this case, the filter cover 10 is structured such that a base portion 10e connected to the opening chamber 10c is attached to an outer periphery of the fuel pump P by a band 11.

In accordance with the structure mentioned above, the fuel within the fuel tank T flows into the opening chamber 10c and the closing chamber 10d from the opening portion 10b of the filter cover 10 so as to be reversed, and the fuel within the filter cover 10 is filtered by the filter 4 so as to be sucked into the pump intake path Pa.

Further, since the filter cover 10 is arranged in the outer periphery of the filter 4 in a surrounding manner as mentioned above, the filter 4 arranged between the fuel pump P and the lid member 1 and arranged close to the bottom portion Ta of the fuel tank T is not directly brought into contact with the bottom portion Ta of the fuel tank T, and even at a time when the filter 4 is vibrated, the filter 4 is not directly brought into contact with the bottom portion Ta of the fuel tank T in spite that the filter 4 is brought into contact with the filter cover 10 having the elasticity. Accordingly, abrasion of the filter 4 due to collision is not generated, and the filter 4 is not deformed, so that the filter 4 can maintain a stable filtering performance.

In the structure mentioned above, since the motor cycle is particularly exposed to greater vibration in comparison with a motor vehicle, it is possible to achieve a great effect at a time of being employed in the motor cycle.

Further, the foreign material floating in the fuel within the fuel tank comes down toward the bottom portion Ta of the fuel tank T on the basis of its own mass at a time when the engine stops. However, at this time, since the other portions of the filter 4 are arranged within the closing chamber 10$d$ of the filter cover 10, it is possible to prevent the foreign material from being attached to the upper surface of the filter 4, and it is possible to maintain a good filtering performance of the filter 4. In addition, since the bottom portion of the filter cover 10 is arranged so as to face to the entire of the lower side of the filter 4, the filter 4 does not directly suck the foreign material coming down on the bottom portion Ta of the fuel tank T.

A description will be given of another embodiment by returning to FIGS. 2, 3 and 4.

Reference symbol 10$f$ denotes an opening portion, which is provided on a side wall forming the opening chamber 10$c$. The side wall 10$f$ corresponds to an opening portion provided at a side wall 10$g$ facing to the closing chamber 10$d$ (the side wall 10$g$ facing to the closing chamber 10$d$ corresponds to a left side wall in FIG. 3).

In other words, the opening portion 10$f$ open at the side wall 10$g$ is open to an inner side of the opening chamber 10$c$ and is open toward an inner side of the closing chamber 10$d$.

Further, reference symbol R denotes a known pressure regulator regulating a pressure of the fuel discharged from the fuel pump P to a predetermined constant pressure. A fuel inflow path 22 and a fuel discharge path 23 are open at a fuel chamber 21 comparted by a diaphragm 20, a valve body 24 moving synchronously with the diaphragm 20 controls so as to open and close a valve seat 25 formed at an end portion at the fuel chamber side of the fuel discharge path 23, and controls the pressure of the fuel directed to the external portion from the discharge pipe 3 to a constant pressure.

In this case, the fuel inflow path 22 of the pressure regulator is connected to the fuel discharge piping 5 by a fuel inflow pipe 26, and the pressure regulator R is attached to the stay 2 or the lid member 1.

Further, the fuel discharge path 23 of the pressure regulator R and the opening portion 10$f$ of the filter cover 10 are connected by a return fuel passage 27.

In accordance with the embodiment mentioned above, a part of the boosted fuel discharged from the pump discharge path Pb of the fuel pump P is supplied into the fuel chamber 21 of the pressure regulator R via the fuel inflow pipe 26 and the fuel inflow path 22, the valve body 24 opens the valve seat 25 in correspondence to the pressure within the fuel chamber 21, and the surplus fuel (the return fuel) is discharged to the return fuel passage 27 from the fuel discharge path 23, whereby the pressure of the fuel flowing within the fuel discharge pipe and the discharge pipe 3 is regulated to a constant pressure.

Further, the return fuel flowing through the return fuel passage 27 in the structure mentioned above is discharged to the inner side of the filter cover 10 via the opening portion 10$f$ of the filter cover 10.

In the present embodiment, since the opening portion 10$f$ is open at the side wall 10$g$ facing to the closing chamber 10$d$ and to the inner side of the opening chamber 10$c$, and is open toward the closing chamber 10$d$, the return fuel flowing within the return fuel passage 27 passes through the opening chamber 10$c$ from the opening portion 10$f$, and is discharged toward the inner side of the closing chamber 10$d$.

In accordance with the structure mentioned above, much of the return fuel flows sideward toward the inner side of the closing chamber 10$d$ from the opening chamber 10$c$, the flow is inverted at a bag-shaped right side wall 10$h$ of the closing chamber 10$d$ in FIG. 3, and much of the return fuel is discharged into the fuel tank T via the opening portion 10$b$ at an upper side of the opening chamber 10$c$.

The fuel flow of the return fuel is shown by a dotted line and an arrow in FIG. 3.

In accordance with the fuel flow of the return fuel, since the return fuel generates an eddy current particularly within the closing chamber 10$d$, and the return fuel is discharged into the fuel tank T from the opening portion 10$b$ largely open at the upper side of the filter cover 10, it is possible to peel off the foreign material on the upper side surface of the filter 4 and the foreign material on the bottom portion of the filter cover 10 so as to discharge into the fuel tank without delay, and it is possible to effectively suppress a clogging of the filter 4.

Further, in the low speed operation of the engine, since an amount of the return fuel from the pressure regulator R is more in comparison with the other operation regions, it is possible to more securely execute the discharging operation of the foreign material mentioned above.

What is claimed is:

1. A fuel supply apparatus for a motor cycle, comprising:
a fuel pump (P) attached to a stay provided in a rising manner on a lid member (1), said lid member (1) arranged to close a lower opening portion at a bottom portion of a fuel tank, said fuel pump (P) having a pump discharge member (Pb) connected to a tank discharge pipe (3) provided in a rising manner on the lid member (1) and a pump intake member (Pa) connected to a filter (4), said fuel pump (P) and said filter (4) are arranged to be inserted into the fuel tank via the lower opening portion,
wherein a longitudinal axis (X-X) of said fuel pump (P) is arranged approximately in parallel to the lid member (1), the pump discharge member (Pb) is arranged near the tank discharge pipe (3), and the filter (4) connected to the pump intake member (Pa) is arranged in a space between the fuel pump (P) and the lid member (1) horizontally in parallel with the bottom portion of the fuel tank.

2. A fuel supply apparatus for a motor cycle, comprising:
a stay provided in a rising manner on a lid member (1), said lid member (1) arranged to close a lower opening portion at a bottom portion of a fuel tank,
a fuel pump (P) attached to said stay, said fuel pump (P) having a pump discharge member (Pb) connected to a tank discharge pipe (3) provided in a rising manner on the lid member (1) via a fuel discharge pipe (5) and a pump intake member (Pa) connected to a filter (4), the fuel pump (P) and the filter (4) are arranged to be inserted into the fuel tank via the lower opening portion,
wherein a longitudinal axis (X-X) of said fuel pump (P) is arranged approximately in parallel to the lid member (1), the pump discharge member (Pb) is arranged near the tank discharge pipe (3), and the filter (4) connected to the pump intake member (Pa) is arranged between a lower outer surface (Pc) of the fuel pump (P) and an upper surface (1$a$) of the lid member (1), wherein the filter (4) is comprised of a rubber material and is accommodated in a box-shaped filter cover (10) so as to be surrounded by the filter cover (10), said filter cover having an opening portion (10*b*) opening upward at an upper side surface (10*a*) of the filter cover (10), an opening chamber (10*c*) opening toward the opening portion (10*b*) and a closing chamber (10*d*) continuous to the opening chamber (10*c*); and a pressure regulator (R) for regulating a pressure of fuel discharged from the fuel pump (P) such that the pressure is maintained at a predetermined constant pressure, the pressure regulator having a fuel regulating discharge member (23) connected to an opening portion (10*f*) at a side wall (10*g*) continuous to the upper side surface (10*a*) of the filter cover (10) via a return fuel passage (27), wherein fuel returned through the return fuel passage (27) is discharged from the opening portion (10*f*) toward the closing chamber (10*d*).

* * * * *